Sept. 9, 1958

L. E. ELLISON 2,851,653

SPARK PLUG TESTER

Filed Dec. 29, 1954

INVENTOR.
BY  LYNN E. ELLISON

Edward H. Lang

ATTORNEY

United States Patent Office 2,851,653
Patented Sept. 9, 1958

2,851,653
SPARK PLUG TESTER

Lynn E. Ellison, Crystal Lake, Ill., assignor to The Pure Oil Company, Chicago, Ill., a corporation of Ohio Application December 29, 1954, Serial No. 478,398

5 Claims. (Cl. 324—16)

The instant invention relates to a device for evaluating the condition of a spark plug. It is especially concerned with an apparatus which may be used to test the sparking characteristics of a spark plug while the plug remains installed in the engine block of a spark-ignited, internal combustion engine.

The modern, high-output, spark-ignited internal combustion engine when delievered from the manufacturer is a complex machine of high efficiency. In order to maintain a high degree of efficiency it is necessary that the component parts of the engine be inspected at frequent intervals to determine whether or not they are malfunctioning. To achieve this end various test apparatus have been devised which are used in the inspection of automobile engines without requiring the dismantling of the engine for inspection purposes. The spark plugs, whose function is to conduct the high potential from the ignition system into the combustion chamber and then allow its discharge across an air gap, are important parts of the engine which should be frequently inspected in order that the spark plugs may efficiently perform these two duties.

A number of devices are described in the prior art for testing the sparking qualities of a spark plug. In most instances in following the test procedures it is necessary to remove the spark plug from the engine. While earlier engine designs have permitted this expedient, with the advent of the more complex engine designs removal of the plug from the engine block for test purposes has become more difficult and inconvenient because of the inaccessibility of the plug positions in modern engines.

Furthermore, testers heretofore described in the prior art generally indicate the extremes of spark plug condition, namely, whether the spark plug is operative or inoperative. They do not, however, detect or evaluate conditions of incipient failure. Accordingly, it is an object of this invention to provide a spark plug tester which will evaluate the sparking characteristics of a spark plug without removing the plug from the engine block. It is also an object of this invention to provide a device which will indicate the degree of effectiveness of a spark plug. These and other objects will be made more apparent from the following detailed description of the instant invention.

With the development of spark-ignited, internal combustion engines having relatively high compression ratios, the spark plugs employed therein have been subjected to more severe conditions of operation. Accordingly, it is necessary that these plugs have sufficiently good electrical characteristics to overcome the increased resistance across the spark gap resulting from the higher pressures in the combustion chamber without any leakage of current through the ceramic insulator element of the plug which surrounds the center electrode. Such leakage can occur through the medium of combustion deposits which accumulate on and in the insulating material. As a result of their deposition there is produced a circuit which will conduct current more readily than an uncontaminated insulator. When this circuit develops less resistance for the current flow in the secondary circuit than the resistance of the gap between the electrodes of the spark plug, part or all of the current will be diverted through this circuit. Accordingly, as the combustion deposits continue to accumulate and depreciate the insulating characteristics of the spark plug insulator, the sparking characteristics of the plug will begin to degenerate and the spark will grow weaker until, finally, failure of the spark will occur under load operations. Thereafter, it begins to manifest erratic performance, followed by eventual failure, even under no-load engine conditions. When the latter situation develops it is readily detected and the defective spark plugs may then be replaced. However, the detection of the incipient condition of failure is difficult to detect or evaluate with prior art testers while the engine is in a static condition and the plugs remain installed in the engine block. However, the apparatus of this invention will not only detect faulty and incipiently faulty plugs by testing the spark plugs mounted in an engine which is not operating, but it will also evaluate their condition, thereby forestalling subnormal efficiency due to poor performance, poor economy and excessive wear in the engine.

Figure 1:
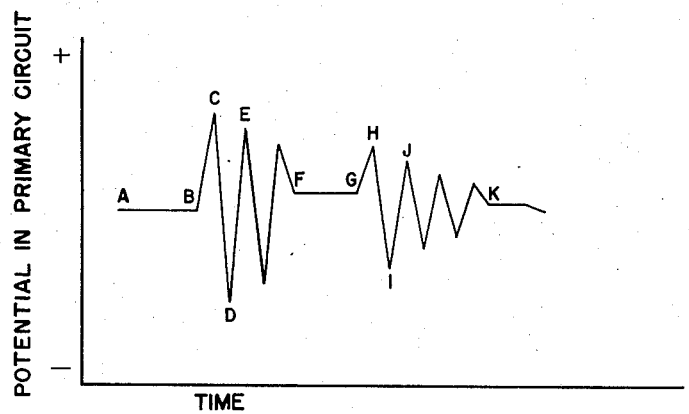
Figure 1 is a graphic presentation of the variation in potential occurring in the primary circuit during the operation of the tester.

The conventional ignition system employed to provide a high potential across the electrodes of the spark plug generally consists of a battery, ignition coil, condenser, distributor and spark plugs. Through the cooperation of these elements a high potential of 10,000–20,000 volts can be produced in the secondary circuit of the ignition system. The electrical action is well-known and is described in a number of standard reference works (Vide Internal Combustion Engines, E. F. Obert, International Textbook, 2nd ed., 1950). In the resonant circuit formed by the condenser and the primary windings of the ignition coil there is produced, by the action of the circuit interrupter which is housed in the distributor, an oscillating current of diminishing magnitude in this resonating circuit. This oscillating current of low voltage is transformed into a high potential due to the transformer effect of the ignition coil, and a similar oscillating current flows in the secondary circuit. It is well-known practice to electrically interconnect an oscilloscope in the primary circuit of the conventional ignition system while the engine is in operation to assist in evaluating the condition of the spark plugs. In Figure 1 is shown the type of voltage wave-form which appears upon the oscilloscope screen due to the variations in magnitude of the voltage in the primary circuit. When the breaker points meet there is a voltage induced in the secondary circuit, but the potential is usually too low to produce a spark at the spark plug because of the relatively slow movement of the magnetic flux. The build-up in potential in the primary circuit during this phase of the cycle is represented by AB. When the breaker points open and the magnetic field about the primary coil collapses, there is induced in the primary circuit a potential, represented by BC, which is not limited to the voltage of the battery. The resulting oscillating current CDEFG of diminishing magnitude flows in the primary circuit for the brief interval that is required for the primary circuit to return to a state of equilibrium. This oscillatory phase is known as the primary voltage phenomenon. If the voltage phenomenon occurring in the primary circuit is made manifest by means of a cathode-ray oscillograph, following the primary voltage phenomenon by an elapsed time of a few microseconds, indicated by GH, a secondary voltage phenomenon, indicated by HIJK, occurs. The potential produced is not sufficient to produce a spark at the spark gap. Accordingly, an oscillating current only flows in the primary circuit. It is this secondary voltage and resulting current flow which forms the basis for the instant invention because it has been found that the extent of this phenomenon can be correlated with the quality or condition of the spark plug. While this phenomenon is clearly shown in a wave-form exhibited on an oscillograph, it was not understood how it is produced. From a study of this phenomenon, it would appear that the potential is due to a residual charge on the condenser in the spark-ignitor system which remains after the primary circuit has returned to a state of equilibrium. Because of the relation between the condition of the spark plug and the magnitude of the potential, it may be that the oscillations in the secondary circuit which occur during the primary voltage phenomenon influence the production of this residual charge. These, however, are only postulations and are not to be construed as limitations on the instant invention, which is directed to a means for measuring the magnitude of this secondary phenomenon potential. The magnitude of the maximum pulsation occurring during secondary voltage phenomenon is indicative of the condition of the spark plug. For example, if a high peak of voltage occurs during this secondary voltage phenomenon, it is indicative that no leakage of current and a spark gap of proper distance exists. In contra-distinction, if no voltage manifests itself at this point, this indicates a short-circuited spark plug, or at least a spark plug with sufficient current leakage to render it inoperative. Intermediate conditions and points of incipient failure will also be shown by potentials of intermediate magnitudes. Accordingly, the instant invention quantitatively correlates and measures the characteristic of the above-mentioned secondary voltage phenomenon in terms of spark plug quality or condition.

A better understanding of the instant invention will be obtained from the following detailed description of a specific embodiment. It is seen from Figure 2 that in this embodiment there is provided a primary circuit and a secondary circuit. The primary circuit consists of an autotransformer 10 into which is tapped a vibrator-type power supply 11. Transformer 10 is provided with a primary coil 12 and a secondary coil 13. The ratio of the number of turns in the primary windings to the number of turns in the secondary winding must be sufficient to permit the induction, in the secondary circuit, of a potential of sufficient magnitude to provide a spark between the electrodes of the spark plug interconnected in the secondary circuit. A suitable transformer will consist of a primary winding of about 200 turns of #20 gauge copper wire wound on an iron core and a secondary winding of about 18,000 turns of #38 gauge copper wire overlaying the primary windings. It is to be noted that to minimize the number of electrical connections the primary and secondary windings are serially connected, thereby permitting the use of the common connection for the grounded terminal. The vibrating power supply 11, circumscribed by a dotted line to indicate that the elements thus enclosed constitute a unitary assembly which is commercially available, is provided with a vibrating reed 14, which functions as a switching means to control the flow of current through normally closed, contact points 15, and normally open, contact points 16 and 17. The reed 14 is a thin, flexible strip prepared from a suitable material, such as steel, which will conduct an electrical current. Generally, a small weight 18 is affixed to the free end of the vibrator to impart inertia to the element and also function as an armature cooperating with magnet coil 19. A direct current power supply 20, such as a 6 volt automobile storage battery, furnishes the electrical power to the primary circuit. The positive terminal of battery 20 is connected to the circuit interrupter by means of leads 25 and 26. An off-on switch 27 is disposed in line 25 to initiate the operation of the instrument. One side of the primary coil is also connected to line 25 by means of line 28. The other side of the primary coil is connected to normally open contact point 16 by means of leads 29 and 30. The primary circuit is then completed by means of reed 14, which is connected to the negative side of batter 20 through leads 31 and 32. This side of the battery is also grounded through lead 33. Condenser 34 is interconnected in parallel with the primary circuit interrupter formed by normally open contact 16 and vibrator reed 14. The primary circuit is coupled in a manner to preclude the passage of stray direct current components, such as by means of condenser 40, to a measuring and indicating circuit which contains full-wave bridge rectifier 41. A suitably calibrated, direct current metering device such as ammeter 42 is electrically connected to the rectifier. In this instance, capacitance means 43 is shunted across to ammeter 42 to dampen the oscillatory effect of the rectifier and permit a steady reading. The measuring circuit is completed from rectifier 41 through lead 44, normally open contact point 17, and reed 14. Suitable connections are provided in the secondary circuit to permit the serial interconnection of the spark gap formed between the center electrode 50 and ground electrode 51 of spark plug 52 with the secondary coil 13. This circuit is completed through ground terminal 53.

In the operation of the apparatus, by closing switch 27 current flows in lines 25 and 26 through coil 19 to point 15, which, in a state of rest, is in contact with metal reed 14. This permits current flow through reed 14 and lines 31 and 32 to battery 20. When current flows through this circuit, a magnetic field is built up in coil 19 and attracts the flexible reed 14 toward coil 19, thereby breaking contact 15 and causing said circuit to open. Consequently, there is no longer any magnetic attraction for reed 14. However, through the inertia developed by this action, the reed not only returns to its normally closed position with respect to contact point 15 but also closes contact point 16. This latter result causes current to flow in the primary circuit to initiate the development of a high potential in the secondary circuit, which occurs when the natural resilience of the reed 14, in combination with the magnetic action of coil 19, causes the contact between point 16 and reed 14 to be broken. This latter phase of oscillation of the reed provides an interruption in the current flow in the primary circuit and causes the primary circuit to resonate in the manner of a conventional automobile ignition system. It is during this phase that the primary voltage phenomenon, ABCDEF, shown in Figure 1, occurs.

When reed 14 is in a neutral position between points 16 and 17, the wave-form is as shown by FG of Figure 1. With reed 14 being attracted by coil 19, contact between reed 14 and point 17 is made which integrates the metering and indicating circuit into the network. The secondary, alternating current voltage phenomenon is taken off through line 54 and condenser 40, rectified by full-wave rectifier 41, and applied to the meter 42. The magnitude of said voltage is quantitatively shown by meter 42, and is dissipated via line 44, point 17, reed 14, and lines 31 and 32 to the ground side of battery and engine to complete the circuit. This sequence is continuously repeated as reed 14 vibrates between contact points 16 and 17.

It should be noted that the particular wave pattern depicted by Figure 1 is that observed with a good spark plug. Part FG remains the same for all plugs, regardless of condition, and hence is not indicative of plug condition. When the resistance between the insulator of a spark plug and the grounded steel shell of the spark plug decreases relative to the normal resistance between the center and ground electrodes of the plug, the voltage represented by section HIJK of Figure 1 decreases proportionately. Also, if, because of a widened gap between the electrodes of the plug, the resistance between the points increases relative to the resistance between the center part of the plug and the body, the voltage shown by section HIJK of Figure 1 increases proportionately. For example, if the resistance between the center part of the plug, apart from the center electrode normally gapped from the body (ground) electrode, and the body is only about one megohm, the plug is essentially short-circuited and would be shown by a straight line at section HIJK in Figure 1.

Before the sprak plug tester of this invention can be employed to evaluate the condition of a used spark plug, it is necessary, as in most conventional methods, that the device be calibrated, employing a spark plug which is the same model or type as the sprak plug which is to be tested. Experimentation has shown that as a result of the secondary voltage phenomenon a current of about 500 microamperes or more may flow in the measuring and indicating circuit. In order that a meter of reasonable scale size can be used, it is desirable to decrease the total amount of current flow by providing a variable resistor 60 in series in this circuit. Thus, when the standard spark plug is being used to calibrate the instrument it is desirable to regulate the flow of current in the measuring and indicating circuit so that only about 60 microamperes are flowing and employ a meter on which the 60 microamperes will be indicated at about 60% of the full scale. If this expedient is employed, a scale reading of 0 to 40 will indicate an unsatisfactory spark plug, 40 to about 50 a spark plug in fair condition, and 50 to 80 a satisfactory spark plug. An anomalous condition may occur in the evaluation of spark plugs in this manner because a reading within the 80 to 100 range will indicate that the spark plug is in an undesirable condition. Such readings occur when spark plugs have become fouled and deposits accumulate on the tips of the electrodes, thus increasing the resistance of the spark gap and permitting lesser amounts of current to flow than would normally flow across the electrodes of a satisfactory spark plug. Plugs which manifest such conditions are generally those which are employed in outboard motors, where lubricating oils are admixed with the motor fuel to provide lubrication. This method of calibration is preferred. However, other techniques, as well as the use of other types of calibrated instruments, may suggest themselves to those skilled in the art. Such alternatives are also considered within the scope of this invention.

The wave-form at section HIJK of Figure 1, may assume an almost infinite number of shapes, depending on a wide variety of types of plug deterioration, and combinations thereof. Personal observation of the wave-forms on an oscilloscope can only provide in the extreme conditions a rough, qualitative estimate of whether or not a plug is bad. The device of this invention is, in effect, an analog computer which averages the variations in potential oscillations occurring during the secondary voltage phenomenon. This permits the exact condition of the spark plug to be precisely, quantitatively evaluated. The fleeting observations which can be made by the use of an oscillograph do not permit an operator to make rapid, visual evaluations with any reasonable degree of accuracy. Accordingly, the instant invention completely eliminates the large personal element involved in such observations and the qualitative interpretations based thereon.

Figure 2:
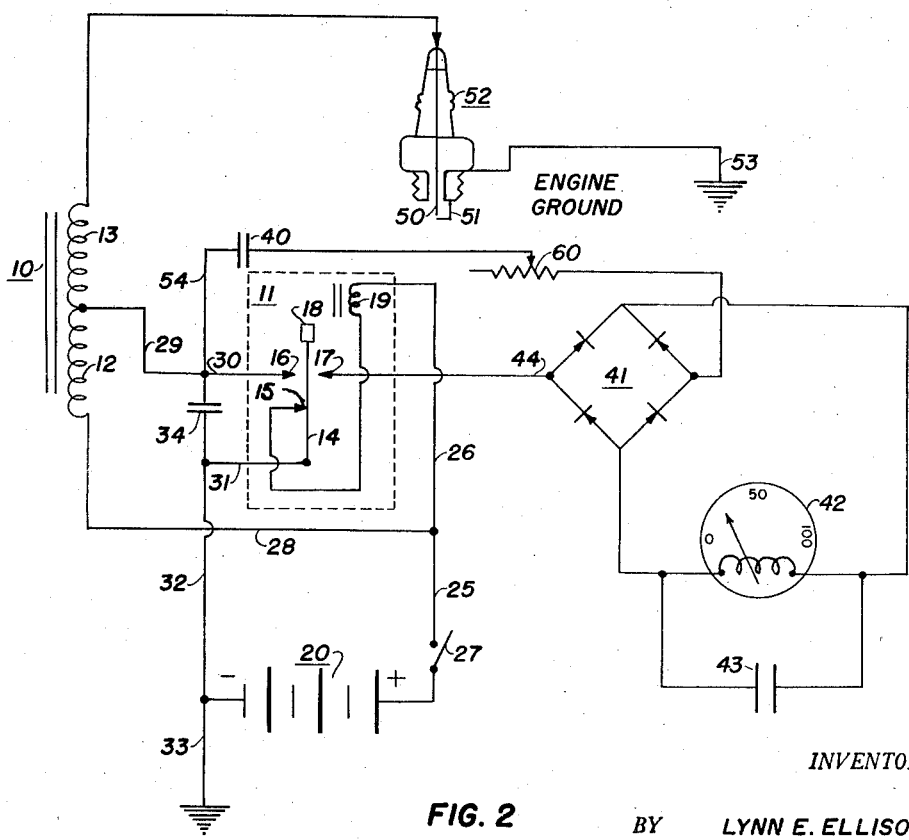
Figure 2 is a schematic diagram of a preferred embodiment of the instant invention.

The apparatus illustrated in Figure 2, and herein described, is only illustrative of the preferred embodiment of this invention. In the assembling of other equivalent apparatus for carrying out the instant invention there are a number of expedients which may be employed. The vibrator-type of power supply cooperating with the capacitance means in the primary circuit may be substituted by other sources of direct current power, such as rotary converters, thyratron tubes systems, or other equipment which, together with the capacitance means, will produce in the primary circuit an intermittent instantaneous pulse of direct current which will induce a sufficiently high potential to produce a spark in the secondary circuit. In addition, there is an alternate type of vibrator power supply which may be employed. In this alternate type of vibrator power supply the magnet coil is alternately energized and deenergized by short-circuiting the current flow to the coil rather than positively disconnecting the coil from the power supply. While in the illustrated embodiment the indicating and measuring circuit is not directly coupled to the primary circuit, it is intended that the instant invention include devices in which these two circuits are directly connected. If such an expedient is employed, it will be necessary to interrupt any flow of direct current in the primary circuit during the measurement of the secondary voltage phenomenon. Switch means for effecting this will be obvious to those skilled in the art. It is preferred, however, that coupling means be employed to transfer energy between these circuits. It will be noted that the illustrated device employs a capacitor for coupling the circuits. It is also possible to couple the measuring and indicating circuit to the primary circuit by means other than that employed in the apparatus illustrated in Figure 2. The function of the coupling means is to transfer the energy produced by the secondary voltage phenomenon, which is in the nature of an alternating current, without permitting the passage of any stray direct current components which may co-exist in the primary circuit, with the secondary voltage phenomenon. Accordingly, the measuring and indicating circuit may be inductively coupled to the primary circuit. Although a direct current ammeter is employed as the indicating instrument, other equivalents of this element include other types of electrical measuring instruments which will meter the secondary votlage phenomenon. In the event no rectification is effected in measuring and indicating circuit, obviously an appropriate alternating current metering instrument, such as an ammeter or voltmeter, may be used. The rectification of the alternating current flow as shown in the illustrated embodiment permits the use of direct current metering instruments. These may be simple ammeters or voltmeters, or may be electronic devices, such as vacuum tube voltmeters, electronic amplifiers with binary or Veeder root counters, etc. Because a number of modifications of the illustrated embodiment will be apparent to those skilled in the art, the instant invention is limited only with respect to the express limitations set forth in the appended claims.

Accordingly, I claim as my invention:

1. A spark plug tester comprising an electrical network containing a step-up voltage transformer having a primary winding and a secondary winding serially interconnected, the ratio of turns in the primary winding to turns in the secondary winding being such as to produce in the secondary winding a potential great enough to ionize an air gap between the two electrodes of a spark plug interconnected to said secondary winding; a primary circuit comprising a vibrator power supply containing a first, normally open contact and a second, normally open contact, a vibrating armature which alternately engages with said contacts, means for vibrating said armature comprising a magnet coil energized by current from a direct current power source flowing through said armature when in normal position, a capacitance connected in parallel with the first of said contacts and said armature, a direct current power supply, and means for serially connecting said primary winding, said capacitance, said first contact, said vibrating means, and said armature to said power supply; an indicating and metering circuit coupled to said primary circuit whereby only oscillating current in said primary circuit is transmitted to said indicating and metering circuit, the other normally open contact being connected in said indicating and metering circuit whereby said indicating and metering circuit is electrically connected to said primary circuit immediately subsequent to instantaneous discharge of current produced in said primary circuit through the cooperation of said first, normally open contact and said vibrating armature, and a means connecting an electrical measuring meter for metering the energy produced in said indicating and metering circuit; and a secondary circuit comprising a spark plug having a center electrode and a ground electrode, said electrodes being serially connected to said secondary winding.

2. A spark plug tester comprising an electrical network containing a step-up voltage transformer having a primary winding and a secondary winding serially interconnected, the ratio of turns in the primary winding to turns in the secondary winding being such as to produce in the secondary winding a potential great enough to ionize an air gap between the two electrodes of a spark plug connected to said secondary winding, a primary circuit comprising a vibrator power supply, said power supply containing a first, normally open contact and a second, normally open contact, a vibrating armature which alternately engages with said first and second contacts, and a third, normally closed contact cooperating with said vibrating armature, a magnet coil, said third, normally closed contact cooperating with said magnet coil to vibrate said armature, a capacitance connected in parallel with said first, normally open contact and said vibrating armature, a direct current power supply and means for serially connecting said primary winding, said capacitance, said first and third contacts, said armature, and said magnet coil to said power supply; an indicating and metering circuit capacitively coupled to said primary circuit, means connecting said second, normally open contact in said indicating and metering circuit whereby said indicating and metering circuit is connected to said primary circuit immediately subsequent to an instantaneous discharge of current produced in said primary circuit through the cooperation of said first, normally open contact and said vibrating armature, a power rectifier for converting the alternating current flow in said indicating and metering circuit to direct current, and an electrical measuring meter for metering the direct current flowing in said indicating and measuring circuit; and a secondary circuit comprising a spark plug having a center electrode and a ground electrode, said electrodes being serially connected to said secondary winding.

3. A spark plug tester in accordance with claim 2 in which the power rectifier contained in the indicating and metering circuit is a crystal-type rectifier.

4. A spark plug tester comprising a source of direct electrical current serially connected to the primary winding of a step-up voltage transformer, the primary and secondary windings of said transformer being serially connected, means for connecting a spark plug in series with said secondary winding, a capacitance connected to said source of direct current in series and cooperating with said primary winding to provide a resonant circuit, a two-way contact switch having a vibrational member adapted to oscillate between two fixed contact members, electrical means for oscillating said contact member, one contact member being electrically connected to a point between said primary and secondary windings and the other contact member being electrically connected through an alternate current rectifier to an electric meter, said meter being contained in a circuit, including said capacitance and vibrational member, shunted across the primary winding, whereby in one closed position of the switch the primary winding and current source are in closed circuit with the shunted circuit open, and in the other closed position the primary winding circuit and the shunted circuit are both closed.

5. A spark plug tester comprising an electrical network containing a step-up voltage transformer having primary and secondary windings serially connected, a primary circuit comprising a vibrator power supply having spaced first and second fixed contacts with a vibrational armature mounted therebetween, a third contact normally in closed engagement with said vibrational armature, electrical means connected in the same circuit as said third contact for causing said armature to vibrate in alternate engagement with said first and second contacts, means for opening and closing the circuit in which said electrical means is connected, a capacitance connected in parallel with said first fixed contact and said armature, a direct current power source connected in series with said primary winding, capacitance, armature and said first and third contacts, an indicating and metering circuit capacitively coupled to said primary circuit, said indicating and metering circuit including said second contact, a power rectifier for converting alternating to direct current and a meter for measuring direct current, and a secondary circuit comprising said secondary winding and means for connecting a spark in series to said secondary winding.

References Cited in the file of this patent

UNITED STATES PATENTS

| | | |
|---|---|---|
| 2,108,014 | Jones | Feb. 8, 1938 |
| 2,312,840 | Lansdale | Mar. 2, 1943 |
| 2,324,458 | Peters et al. | July 13, 1943 |
| 2,430,069 | Mesh | Nov. 4, 1947 |